(12) United States Patent
Thelen

(10) Patent No.: US 7,496,722 B2
(45) Date of Patent: Feb. 24, 2009

(54) MEMORY MAPPED PAGE PRIORITIES

(75) Inventor: Gregory William Thelen, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 363 days.

(21) Appl. No.: 11/114,532

(22) Filed: Apr. 26, 2005

(65) Prior Publication Data

US 2006/0242369 A1    Oct. 26, 2006

(51) Int. Cl.
    *G06F 12/00* (2006.01)
(52) U.S. Cl. ............... 711/158; 711/133; 711/151; 711/160; 711/203; 711/206; 707/205
(58) Field of Classification Search ............... 711/157, 711/158, 151, 203, 206, 133, 160; 707/100, 707/205
See application file for complete search history.

(56) References Cited

U.S. PATENT DOCUMENTS

| | | | | |
|---|---|---|---|---|
| 5,555,399 A | * | 9/1996 | Waldron et al. | 711/159 |
| 5,802,343 A | * | 9/1998 | Fandrich et al. | 711/158 |
| 6,647,472 B2 | * | 11/2003 | Atkinson et al. | 711/158 |
| 6,826,760 B1 | * | 11/2004 | Hunt et al. | 719/328 |
| 6,886,085 B1 | * | 4/2005 | Shuf et al. | 711/159 |
| 2002/0065867 A1 | * | 5/2002 | Chauvel | 709/104 |
| 2004/0068627 A1 | * | 4/2004 | Sechrest et al. | 711/158 |

* cited by examiner

*Primary Examiner*—Stephen C Elmore

(57) ABSTRACT

A method of communicating memory mapped page priorities includes a software application storing page priority information for a memory mapped file on a computer readable medium, and an operating system reading the page priority information.

13 Claims, 2 Drawing Sheets

MEMORY MAPPED PAGE PRIORITIES

BACKGROUND

Data stored on a mass storage device such as a hard drive in a computer system may be accessed in a number of ways. One conventional method is to use read and write system calls through the operating system. However, system calls impose a relatively large delay that is often unacceptable in high performance software applications. Another conventional method is to use memory mapped files. This maps the file into the virtual address space for the software application. The file may then be accessed using a virtual memory address within the range corresponding to the memory mapped file. The virtual memory subsystem of the operating system can swap portions of the file between the mass storage device and memory as they are accessed. This effectively caches portions of the file in memory, which can be accessed much more quickly than typical mass storage devices. Thus, memory mapped files have several benefits, including avoiding the overhead of a system call and caching portions of the files in memory.

In most modern computer systems, memory is divided into blocks called pages. The virtual memory subsystem swaps pages between memory and a page file on the mass storage device. If a page is accessed by a software application and is not resident in memory, the virtual memory subsystem may copy the page from the mass storage device into memory, after freeing up space in memory for the page if necessary. Pages that remain resident in memory can subsequently be accessed rapidly without copying them from mass storage. The virtual memory subsystem sees memory usage for all processes in the computer system and can adjust per-process memory utilization. The virtual memory subsystem may attempt to optimize which pages are kept in memory and which are swapped out to mass storage, using a generic algorithm such as keeping the most recently used pages in memory and swapping out the least recently used. However, the virtual memory subsystem does not know what pages are most likely to be used in the future, sometimes resulting in removal of high priority pages and increased swapping or thrashing.

The Microsoft Windows® operating system does provide VirtualLock/VirtualUnlock system calls which enable an application to tell the virtual memory manager that a particular page should not be swapped out to disk. However, this approach is limited in that applications may only divide pages into locked pages which cannot be swapped out of memory, and unlocked pages which can.

SUMMARY

A method of communicating memory mapped page priorities includes a software application storing page priority information for a memory mapped file on a computer readable medium, and an operating system reading the page priority information.

BRIEF DESCRIPTION OF THE DRAWINGS

Illustrative embodiments are shown in the accompanying drawings as described below.

DESCRIPTION

The drawings and description, in general, disclose a method and apparatus for communicating memory mapped file page priorities to an operating system. A software application that opens one or more memory mapped files prioritizes the pages of the memory mapped files. The application stores the page priority information in a data structure that is accessible to the operating system. The operating system then reads the page priority information from the data structure and bases page swapping decisions at least partially on the page priority information provided by the application through the data structure. The application is thus able to indicate to the operating system which pages of a memory mapped file have a high priority and should be cached in memory, and which pages of the memory mapped file have a low priority and may be swapped out to a page file on disk. This avoids the large overhead and limited utility of making system calls to control page swapping of memory mapped files. Data stored in a memory mapped file on a mass storage device such as a computer hard drive may thus be accessed by a high performance application without the large overhead of repeated system calls or thrashing due to unoptimized page swapping.

Figure 1:
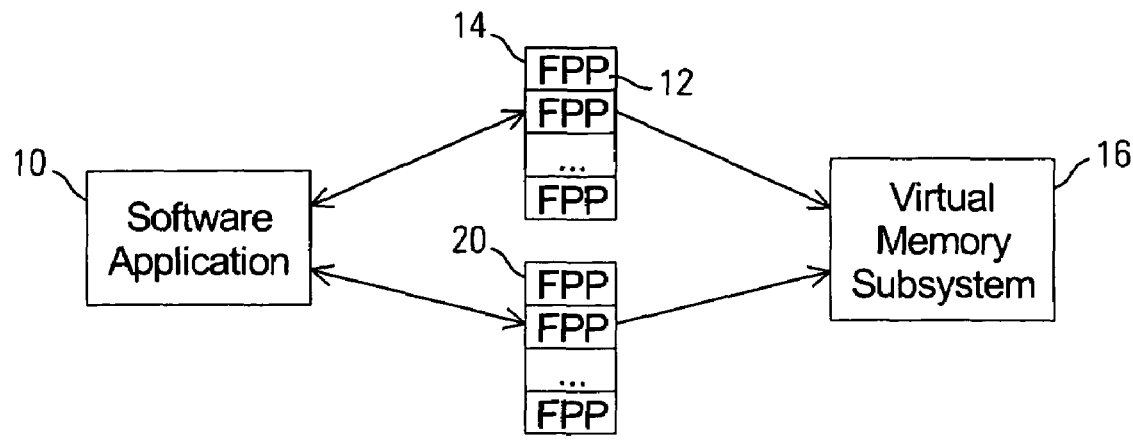
FIG. 1 is a block diagram illustrating an exemplary memory mapped page priority system.

An exemplary memory mapped page priority system is illustrated in FIG. 1. An application 10 stores file page priorities (FPPS, e.g., 12) for a memory mapped file in a data structure 14. A virtual memory subsystem 16 (or other portion of an operating system) then reads the page priorities as it manages the caching of the memory mapped file. In one exemplary embodiment, one data structure is created for each memory mapped file, that is, one data structure for each file opened by the application. For example, in the exemplary system illustrated in FIG. 1, the application 10 has two memory mapped files, so two data structures 14 and 20 are created. Alternatively, a data structure may contain page priority information for multiple memory mapped files or even multiple applications, although this might complicate the addressing and indexing of the data structure and might require that multiple applications be able to access the same data structure.

The memory mapped files for which a data structure is created may be part of the program code of the application storing the page priority information, or may be data files manipulated by the application, or may be any other files about which the application has page priority information to be communicated to the operating system.

The data structure 14 may have any suitable structure and configuration to store the page priorities and to facilitate the function of the virtual memory subsystem 16. Various computer architectures and programming languages provide different types of data structures that may be used, such as arrays, maps, etc. The size of the data structure would be proportional to the size of the mapped view of the file, with one page priority value per page of file data. In one exemplary embodiment, the data structure 14 comprises a flat linear array, and the page offset within the memory mapped file is used as the index into the flat linear array to locate the corresponding page priority. A base address is used for each memory mapped file to locate its corresponding page priority array. The offset of a page is then used as the index into the page priority array to read or write the priority of that page in the array. Exemplary array elements comprise a one byte page priority code, although this may be adapted as desired based on the prioritization scheme.

In one alternative embodiment, the data structure may be optimized for lookup by page priority. For example, the data structure may be indexed by page number and page priority. When the virtual memory subsystem needs to reclaim a page in memory to load a new page, it could thus simply identify the lowest priority page that is currently resident in memory using the optimized data structure. The data structure contains the page priority of all pages in the memory mapped file, even pages that are not resident in memory.

The application may prioritize pages of a memory mapped file in any suitable way. For example, the application might assign each page one of a predetermined set of priorities, such as a priority number between one and five. Alternatively, the application could assign relative priorities by incrementing and decrementing page priorities. Any page prioritization scheme which facilitates the cache management for a memory mapped file by a virtual memory subsystem may be used.

The exemplary data structure is stored in system memory and is owned and managed by the application, although it may be a candidate for paging out to disk by the operating system. For example, if the application is a database application that has been inactive for a long period of time, with the database stored in a memory mapped file, the operating system may page the entire database and the associated data structure out to disk to save memory for other active processes.

The application has read and write access to the exemplary data structure, although the application may or may not need read access. The virtual memory subsystem has read-only access to the exemplary page priority data structure. However, if the page prioritization scheme would benefit from feedback from the operating system, the operating system may be provided with read and write access to the page priority data structure to communicate with the application about page priorities. For example, if the page prioritization scheme applied by the application would benefit from knowing which pages were resident in memory, the operating system may communicate this information to the application using the data structure.

To implement the method and apparatus for communicating memory mapped page priorities to an operating system, the application and the virtual memory subsystem in the operating system are both adapted to use the page priority data structures. In one exemplary embodiment, the application generates the data structure and uses a system call to communicate the location and other details of the data structure to the operating system. (If no system call is made, the virtual memory subsystem of the operating system would manage the caching of memory mapped files in the conventional manner, without prioritization.) The system call used to identify the data structure need only be executed once by the application, such as when a memory mapped file is opened, and page priorities may thereafter be modified simply by accessing the data structure, without the overhead of additional system calls and without synchronization between the application and the operating system. The exemplary system call is an independent system call, dedicated to the identification of a data structure and optionally, identification of the application or other details such as the organization of the data structure. Alternatively, an existing system call may be modified to include this information, such as the system call used to open a memory mapped file. The operating system is adapted to receive the system call identifying the data structure, and to access the data structure when swapping pages in and out of memory for a memory mapped file. For example, when the operating system needs to reclaim a page, it is adapted to access the data structure to identify the lowest priority page that is resident, then to swap that page out of memory. Note that these functions may be performed by the virtual memory subsystem in the operating system, or in any other portion of the operating system.

In the exemplary embodiment, the application and the virtual memory subsystem or other portion of the operating system are executed in the same computer system, although the method and apparatus for communicating memory mapped page priorities to an operating system is not limited to this configuration.

Figure 2:
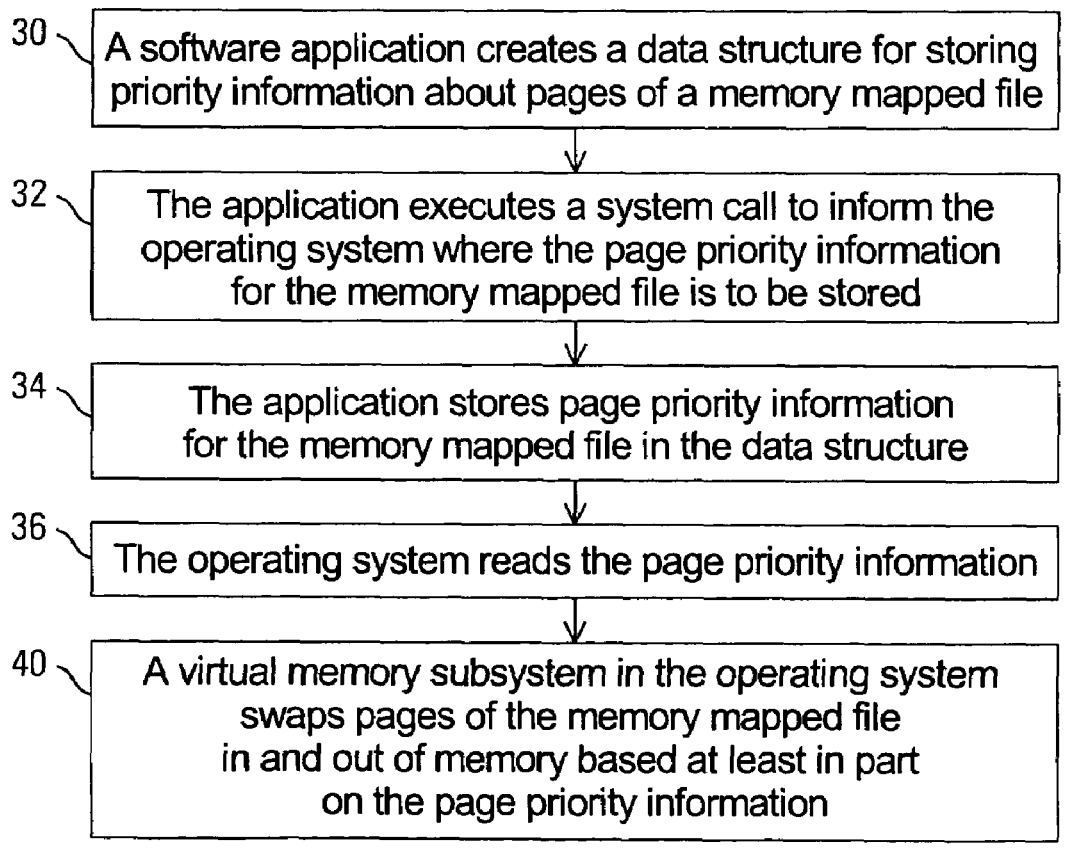
FIG. 2 is a flow chart illustrating an exemplary operation for communicating memory mapped page priorities.

An exemplary operation for communicating memory mapped page priorities from an application to an operating system is summarized in the flow chart of FIG. 2. A software application creates 30 a data structure for storing priority information about pages of a memory mapped file. The application executes 32 a system call to inform the operating system where the page priority information for the memory mapped file is to be stored. The application stores 34 page priority information for the memory mapped file in the data structure. The operating system reads 36 the page priority information, and a virtual memory subsystem in the operating system swaps 40 pages of the memory mapped file in and out of memory based at least in part on the page priority information. Note that the operation for communicating memory mapped page priorities is not limited to this order of operation.

Figure 3:
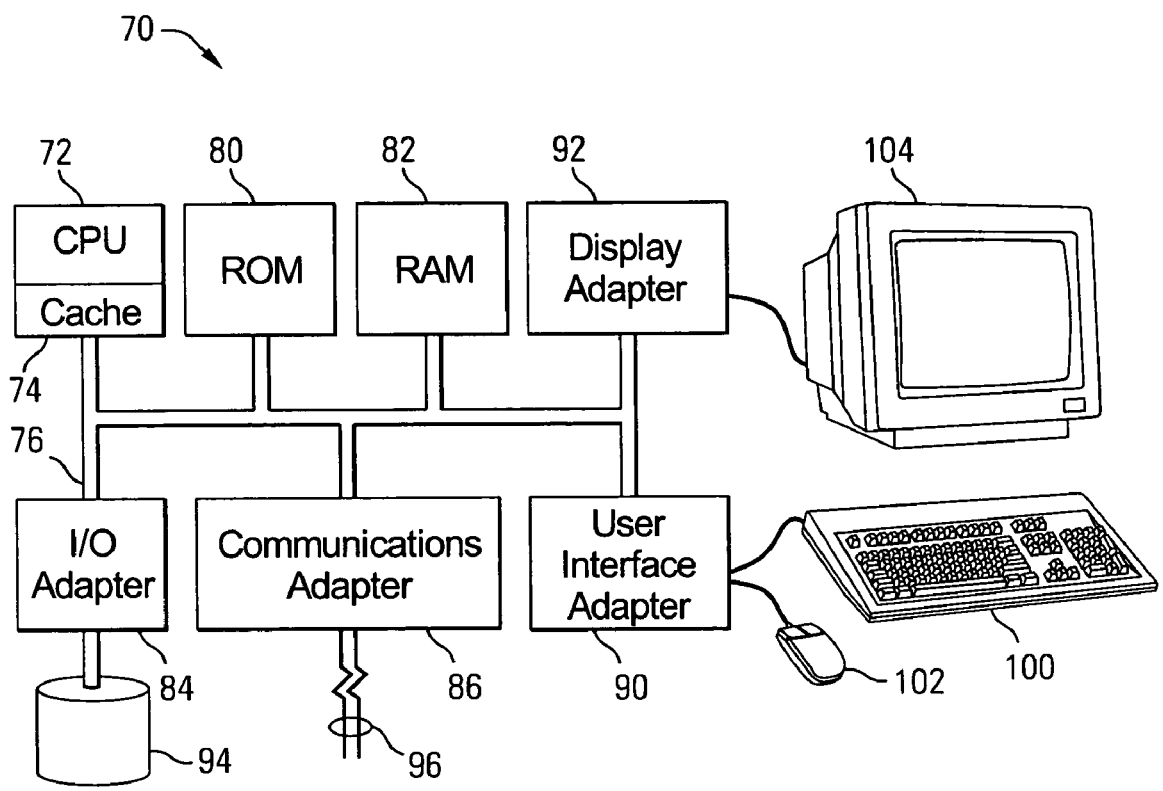
FIG. 3 is a block diagram of an exemplary computer system that in which memory mapped page priorities may be communicated from an application to an operating system.

A typical computer system in which the method and apparatus for communicating memory mapped page priorities to an operating system may be applied is illustrated in the block diagram of FIG. 3. A computer system 70 generally includes a central processing unit (CPU) 72 with a cache 74, connected by a system bus 76 to devices such as a read-only memory (ROM) 80, a random access memory (RAM) 82, an input/output (I/O) adapter 84, a communications adapter 86, a user interface adapter 90, and a display adapter 92. Data storage devices such as a hard drive 94 are connected to the computer system 10 through the I/O adapter 84. In operation, the CPU 72 in the computer system 70 executes instructions stored in binary format on the ROM 80, on the hard drive 94, in the RAM 82, and in the cache 74, causing it to manipulate data stored in the RAM 82 and the cache 74 to perform useful functions. The computer system 70 may communicate with other electronic devices through local or wide area networks (e.g., 96) connected to the communications adapter 86. User input is obtained through input devices such as a keyboard 100 and a pointing device 102 which are connected to the computer system 70 through the user interface adapter 90. Output is displayed on a display device such as a monitor 104 connected to the display adapter 92. An operating system and application stored on the hard drive 94 are executed by the CPU 72. The application communicates page priorities for memory mapped files to the operating system as described above, and the virtual memory subsystem of the operating system swaps pages of the memory mapped files between the hard drive 94 and the RAM 82 based at least in part on the page priority information provided by the application.

Various computer readable or executable code or electronically executable instructions have been referred to herein. These may be implemented in any suitable manner, such as software, firmware, hard-wired electronic circuits, or as the programming in a gate array, etc. Software may be programmed in any programming language, such as machine language, assembly language, or high-level languages such as C or C++. The computer programs may be interpreted or compiled.

Computer readable or executable code or electronically executable instructions may be tangibly embodied on any computer-readable storage medium or in any electronic circuitry for use by or in connection with any instruction-executing device, such as general purpose processor, software emulator, application-specific circuit, a circuit made of logic gates, etc. that can access or embody, and execute, the code or instructions.

Methods described and claimed herein may be performed by the execution of computer readable or executable code or electronically executable instructions, tangibly embodied on any computer-readable storage medium or in any electronic circuitry as described above.

A storage medium for tangibly embodying computer readable or executable code or electronically executable instructions includes any means that can store, transmit, communicate, or in any way propagate the code or instructions for use by or in connection with the instruction-executing device. For example, the storage medium may include (but is not limited to) any electronic, magnetic, optical, or other storage device, or any transmission medium such as an electrical conductor, an electromagnetic, optical, infrared transmission, etc. The storage medium may even comprise an electronic circuit, with the code or instructions represented by the design of the electronic circuit. Specific examples include magnetic or optical disks, both fixed and removable, semiconductor memory devices such as memory cards and read-only memories (ROMs), including programmable and erasable ROMs, non-volatile memories (NVMs), optical fibers, etc. Storage media for tangibly embodying code or instructions also include printed media such as computer printouts on paper which may be optically scanned to retrieve the code or instructions, which may in turn be parsed, compiled, assembled, stored and executed by an instruction-executing device. The code or instructions may also tangibly embodied as an electrical signal in a transmission medium such as the Internet or other types of networks, both wired and wireless.

While illustrative embodiments have been described in detail herein, it is to be understood that the concepts disclosed herein may be otherwise variously embodied and employed, and that the appended claims are intended to be construed to include such variations, except as limited by the prior art.

What is claimed is:

1. A method of communicating memory mapped page priorities, the method comprising:
    storing page priority information for a memory mapped file in a software application on a physical computer readable medium; and
    reading said page priority information using an operating system; and
    swapping portions of said memory mapped file in and out of memory based at least in part on said page priority information.

2. The method of claim 1, wherein said swapping is performed by a virtual memory subsystem in said operating system.

3. The method of claim 1, further comprising performing a system call to inform said operating system where said page priority information is to be stored by said software application.

4. The method of claim 1, further comprising reading said page priority information from said computer readable medium using said software application.

5. The method of claim 1, wherein said page priority information is stored in a data structure.

6. The method of claim 5, wherein said data structure comprises an array.

7. The method of claim 6, wherein a page offset within said memory mapped file comprises an index into said array.

8. The method of claim 5, wherein said data structure is resident in memory.

9. The method of claim 8, wherein said data structure is a candidate for paging to disk.

10. The method of claim 5, wherein said page priority information is stored in one data structure per memory mapped file associated with said software application.

11. The method of claim 5, wherein said data structure is optimized for lookup of pages by priority.

12. The method of claim 5, further comprising storing information about said memory mapped file in said data structure using said operating system.

13. An apparatus for communicating memory mapped page priorities, comprising:
    a physical computer readable medium;
    means in a software application for storing priority information about at least one memory mapped file in a software application to a said computer readable medium; and
    means in an operating system for moving pages of said at least one memory mapped file into and out of a page file based at least in part on said priority information on said computer readable medium.

* * * * *

UNITED STATES PATENT AND TRADEMARK OFFICE
CERTIFICATE OF CORRECTION

PATENT NO.       : 7,496,722 B2
APPLICATION NO.  : 11/114532
DATED            : February 24, 2009
INVENTOR(S)      : Gregory William Thelen Page 1 of 1

It is certified that error appears in the above-identified patent and that said Letters Patent is hereby corrected as shown below:

In column 4, line 67, after "such as" insert -- a --.

In column 5, line 30, after "also" insert -- be --.

In column 6, line 38, in Claim 13, after "to" delete "a".

Signed and Sealed this

Seventh Day of July, 2009

JOHN DOLL
*Acting Director of the United States Patent and Trademark Office*